United States Patent [19]
Pyron et al.

[11] Patent Number: 5,659,938
[45] Date of Patent: Aug. 26, 1997

[54] TRANSLATIONAL PRESS AND MANDREL APPARATUS FOR STRAIGHTENING BAGHOUSE CAGES

[76] Inventors: Donald Pyron, 2315 Edgewood; Henry M. Pyron, 1904 W. Elm, both of El Dorado, Ark. 71730

[21] Appl. No.: 383,499

[22] Filed: Feb. 1, 1995

Related U.S. Application Data

[63] Continuation-in-part of Ser. No. 67,823, May 27, 1993, Pat. No. 5,398,386.

[51] Int. Cl.⁶ .................. B21D 37/20; B21D 1/14; B21D 3/16; B23P 6/04
[52] U.S. Cl. .................. 29/252; 29/237; 29/896.62; 72/453.18
[58] Field of Search .................. 29/237, 243.523, 29/252, 896.62, 402.05, 402.19; 72/416, 453.18; 100/207, 208

[56] References Cited

U.S. PATENT DOCUMENTS

| | | | |
|---|---|---|---|
| 3,579,786 | 5/1971 | Johnson | 29/237 X |
| 3,706,123 | 12/1972 | Whitledge | 72/453.18 X |
| 4,141,128 | 2/1979 | Wonderling | 29/896.62 |
| 4,276,765 | 7/1981 | Yoneda | 72/416 X |
| 4,328,608 | 5/1982 | Gibson | 29/252 X |
| 4,418,458 | 12/1983 | Hunter | 29/237 |
| 4,535,822 | 8/1985 | Rogers, Jr. | 29/252 X |

FOREIGN PATENT DOCUMENTS

| | | | |
|---|---|---|---|
| 142729 | 9/1982 | Japan | 29/237 |

*Primary Examiner*—Peter Vo
*Attorney, Agent, or Firm*—Jerry L. Mahurin

[57] ABSTRACT

A Translational Press and Mandrel Apparatus for Straightening Baghouse cages. The mandrel is rigid, fixed, generally cylindrical and disposed generally horizontal to temporarily coaxially receive cages to be straightened. It has a closed generally rounded distal end for receiving the cage to be straightened. Also, the mandrel has a flange disposed on a proximal end to facilitate anchoring the mandrel to a relatively stable structure such as the trailer upon which it is transported. The translational press contacts and straightens the cages disposed on the mandrel. The press comprises a pair of hinged generally hemicylindrical dies adapted to be forced together to form a generally cylindrical form to compress the cage to the contours of the mandrel and joined dies. A carriage mounting the dies and compression means for forcing the dies together is slidably displaceable along the length of a track disposed below and generally parallel to the mandrel.

15 Claims, 3 Drawing Sheets

TRANSLATIONAL PRESS AND MANDREL APPARATUS FOR STRAIGHTENING BAGHOUSE CAGES

CROSS REFERENCE TO RELATED APPLICATION

This is a Continuation-in-Part of U.S. patent application Ser. No. 08/067,823, Filing Date: May 27, 1993, entitled Process for Rejuvenating Baghouse Filter Cartridges (as amended), which issued as U.S. Pat. No. 5,398,386 on Mar. 21, 1995.

BACKGROUND OF THE INVENTION

THE PRIOR ART

The present invention broadly relates to baghouse filtration systems. Specifically, the present invention is a Translational Press and Mandrel Apparatus for Straightening Baghouse cages. Art pertinent to the subject matter of the present invention can be found in U.S. Patent Classes 29 and 55.

Baghouses are employed to filter particulates from air expelled by various commercial processes. Some processes employ baghouses to remove hazardous wastes before venting to the atmosphere. Other processes use baghouses to gather output product.

Most modern baghouses employ a stainless steel skeletal framework, commonly referred to as a cage, to support filter bags. Together the cage and bag form a cartridge. Various mounting systems are used to anchor these cartridges in baghouse structures. Generally speaking, the cartridges are mounted to a tube sheet which is a flat plate with a plurality of cartridge receptive orifices defined in it. The cartridges may be clamped in place. Alternatively, a series of indents or notches defined in a flange around the opening mate with grooves or ribs defined in a shroud on the open end of the cage to hold the cartridge in place. The tube sheet is mounted in the baghouse in such a manner that it separates the input gases from the output gases. Gases to be filtered pass though the bags in one direction or the other, collecting material on the outside or the inside of the bag.

Innumerable patents are directed to baghouse configurations. Birkholz, U.S. Pat. No. 1,821,202, discloses a renewable capsule filter which employs a baghouse structure having a mesh frame. More conventional, modern baghouses are disclosed in several U.S. Patents. Dobyns, U.S. Pat. No. 4,976,756, discloses a dust collector with a hinged roof to facilitate cleaning and use. Heffernan, U.S. Pat. No. 4,309,200,discloses a baghouse with a collapsible filter bag assembly.

Some U.S. Patents speak directly to filter structures and the connections employed to secure the cartridge to the tube sheet. De Martino, U.S. Pat. No. 4,256,473, discloses a cylindrical collar unit used to attach a bag frame to the permanent baghouse structure. Gravley, U.S. Pat. No. 3,937,621, discloses a filter bag cuff. It is basically a ring folded within the fabric of the bag and stitched into place. Reinauer, U.S. Pat. No. 4,073,632, discloses a structure for mounting bags. This structure uses a semirigid bag with an integral framework. This patent discloses two end caps, one which allows the entrance of air and the other which supports the distant end of the bag. Miller, U.S. Pat. No. 4,042,356, discloses a baghouse cell plate and filter bag attachment. Here a structure extends outward from the baghouse cell plate with a grove in it for accepting the upper lip of a filter bag. U.S. Pat. No. 4,424,070 issued to Robinson Jan. 3, 1984, discloses a dust collecting filter cartridge and attachment structure. The attachment structure is an adapter that uses a rubber clamp to mate dissimilarly sized cartridges and tube sheets.

Other patents speaking to baghouse filter structures include: Schaltenbrand, U.S. Pat. No. 4,157,901; Noland, U.S. Pat. No. 4,194,894; Bergquist, U.S. Pat. No. 4,257,790; Brown, U.S. Pat. No. 4,277,874; Nijhawan, U.S. Pat. No. 4,435,197; Reier, U.S Pat. No. 4,618,353; Price, U.S. Pat. No. 5,017,200

U.S. Pat. No. 5,095,607 issued to Simon on Mar. 17, 1992, discloses a tool for securing baghouse filters. It employs a tapered head to expand the open end flange of a baghouse filter cartridge the to facilitate inserting it into the tube sheet or other framework.

Various means are employed to clear the material from the bags in the baghouse. For example, Bundy, U.S. Pat. No. 4,113,449 discloses a two step process. First, the pressure of the gases flowing through the bags is reduced. Next the bags are blasted with high pressure gas to dislodge collected particles. Another method uses vibration. However, over time the bags become so heavily clogged with material that they must be replaced.

The first step in replacing the bags is removal of the cages mounting the filtration bags from the baghouse. Once removed from the baghouse, the bags are stripped from the cages. Previously, bent or damaged cages were generally discarded as scrap metal. Cages are often bent during the stripping process. The value of a cage as scrap metal, in comparison to the cost of a new cage, is minuscule. Welds holding the cages together are often destroyed due to continual exposure to vibration in the baghouse. Welds may also be broken during removal from the bag house or during subsequent handling. Hence, it is desirous to repair damaged cages during a baghouse retrofit. Particularly, it is desirable to straighten bent cages rather than discard them as scrap metal.

SUMMARY OF THE INVENTION

Bent cages can be straightened during the retrofitting process on a rigidly mounted mandrel employing our Translational Press. During retrofit, if upon inspection, cages are found damaged, the cage is slid onto the mandrel. Then a translational press comprising two hemicylindrical dies, a lower rigidly mounted die and an upper die manipulated by hydraulic cylinders is positioned over a bent portion of the cage. The press compresses the cage to the contour of the mandrel. The press can then be slid along its mounting track to another section of cage. Cages having broken welds whether initially or as a result of the straightening process are then rewelded.

Preferably our Translational Press and Mandrel is transported on and deployed in conjunction with a trailer. Particularly, the trailer comprises a stanchion to mount the mandrel.

Therefore, a primary object of the present invention is to provide a translational press and mandrel apparatus for straightening baghouse cages.

An object of the present invention is to provide a mandrel to receive and straighten a bent baghouse cage.

A related object of the present invention is to provide a mandrel which restores the internal diameter of a deformed baghouse cage.

An object of the present invention is to provide an apparatus to compress bent portions of a baghouse cage about a mandrel.

A related object of the present invention is to provide a press which restores the external diameter of a deformed baghouse cage.

Another primary object of the present invention is to provide a process for rendering bent or deformed baghouse cages operable.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

Figure 1:
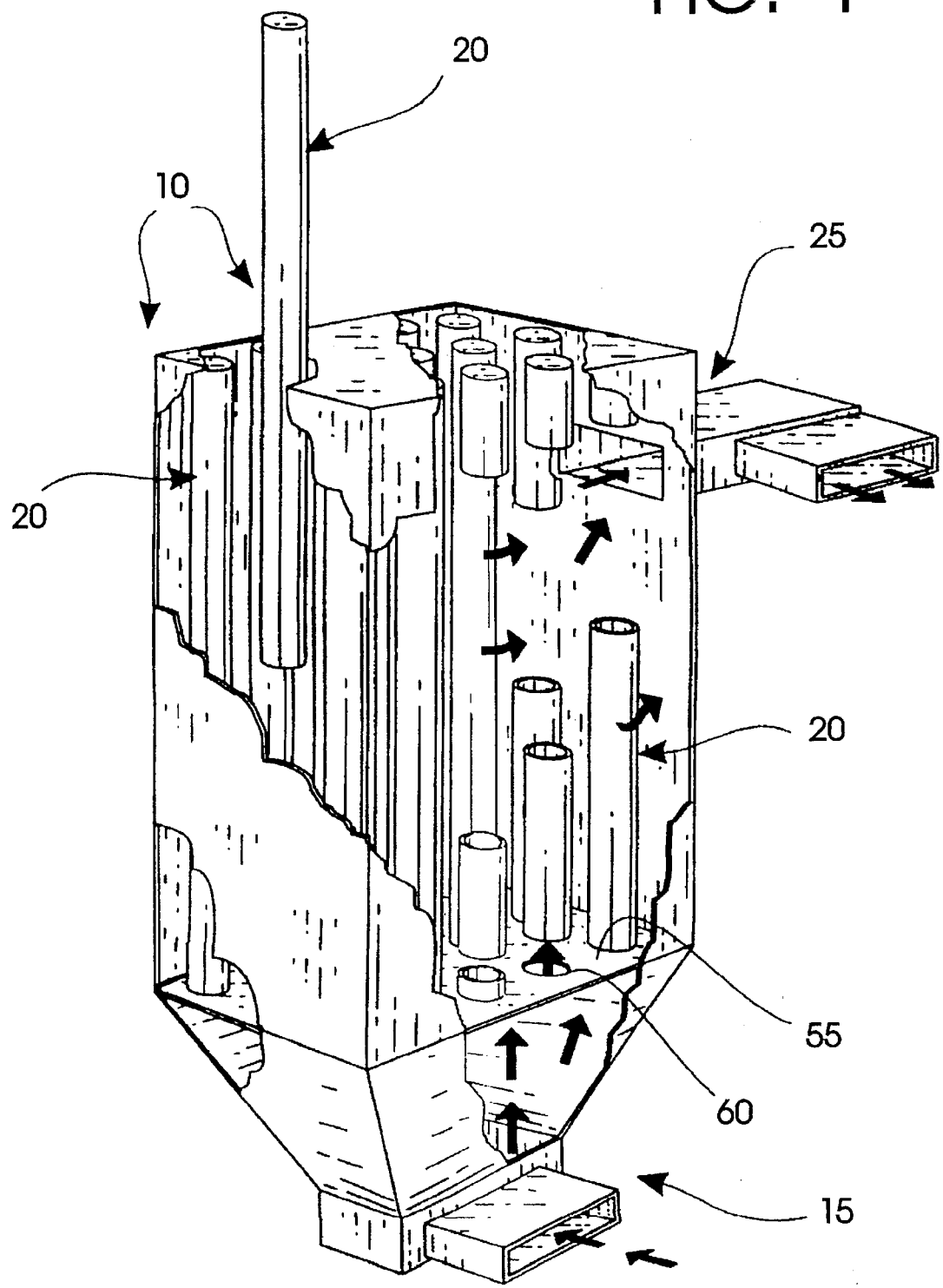
FIG. 1 is a diagrammatic, fragmented, partially exploded isometric view of a typical baghouse illustrating removal of a baghouse cartridge.

With reference now to the accompanying drawings, A typical baghouse, broadly designated by the reference numeral 10, is illustrated in FIG. 1. It generally comprises an inlet plenum 15 in air flow communication, through an array of cartridges 20, with an outlet plenum 25. Each cartridge 20 is comprised of a generally tubular, skeletal cage 30 (FIGS. 2 and 3) with a semipermeable filter bag disposed over it. The cages 30 are usually constructed from stainless steel and are comprised of elongated, round longitudinal spines 40 welded to generally circular hoops 45. Both the spines 40 and hoops 45 are constructed of relatively rigid stainless steel wire. One end of the cage 30 is usually capped by a circular plate 50. Various mounting systems are used to anchor cartridges 20 in baghouse structures 10. Generally speaking, the cages 30 are mounted to a tube sheet 55 (FIG. 1) which is a flat plate separating the inlet plenum 15 from the outlet plenum 25. The tube sheet 55 has a plurality of cage receptive orifices 60 defined in it. The cartridges 20 are usually either clamped in place or a series of indents in the tube sheet 55 mate with grooves 65 defined in a shroud 70 on the cage 20 holding the cartridge 20 in place. The first steps in retrofitting a baghouse 10 are to remove the cartridges 20 from the baghouse and to strip the bags from the cages 30. The cage 30 is then inspected for straightness and other damage such as broken welds. Damaged cages 30 are separated from immediately reusable cages 30 and straightened.

Figure 2:
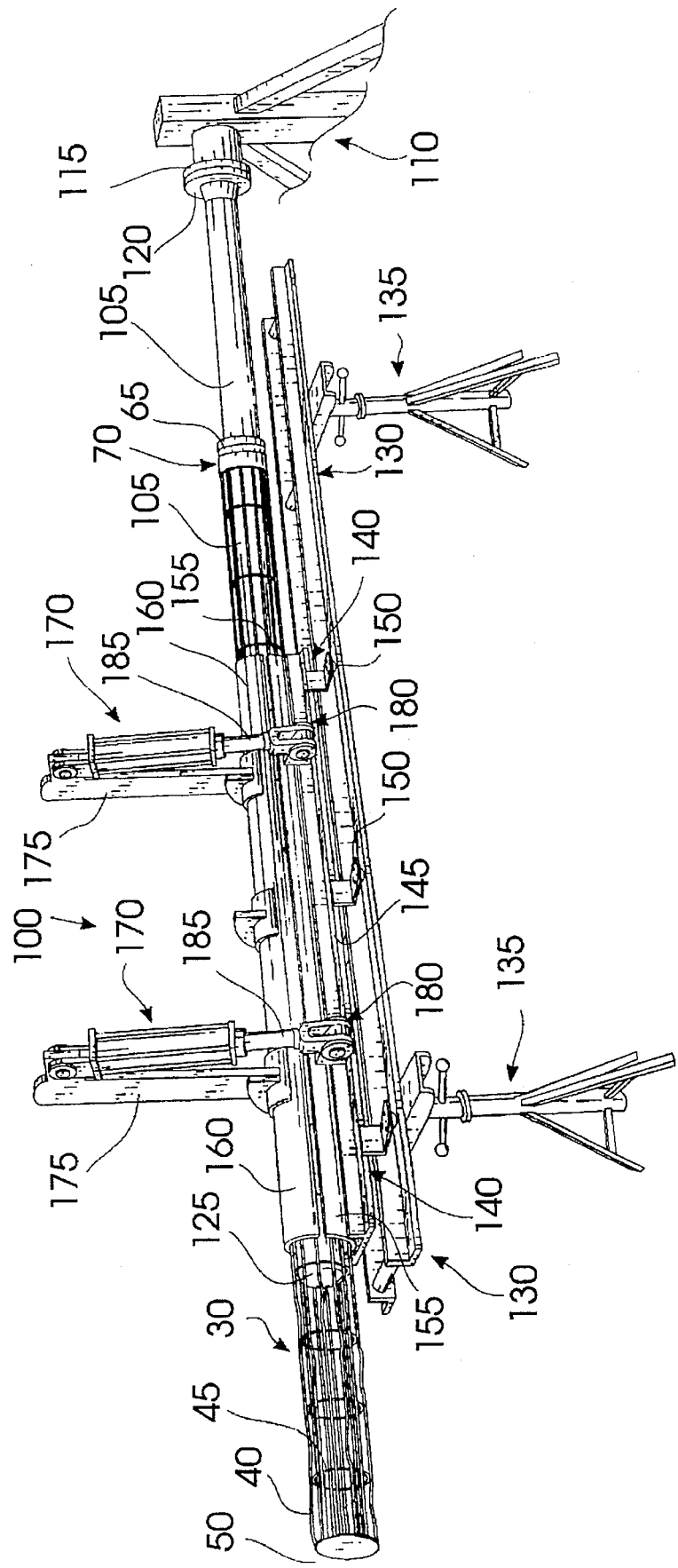
FIG. 2 is an isometric view illustrating our Translational Press and Mandrel Apparatus in operation.
Figure 3:
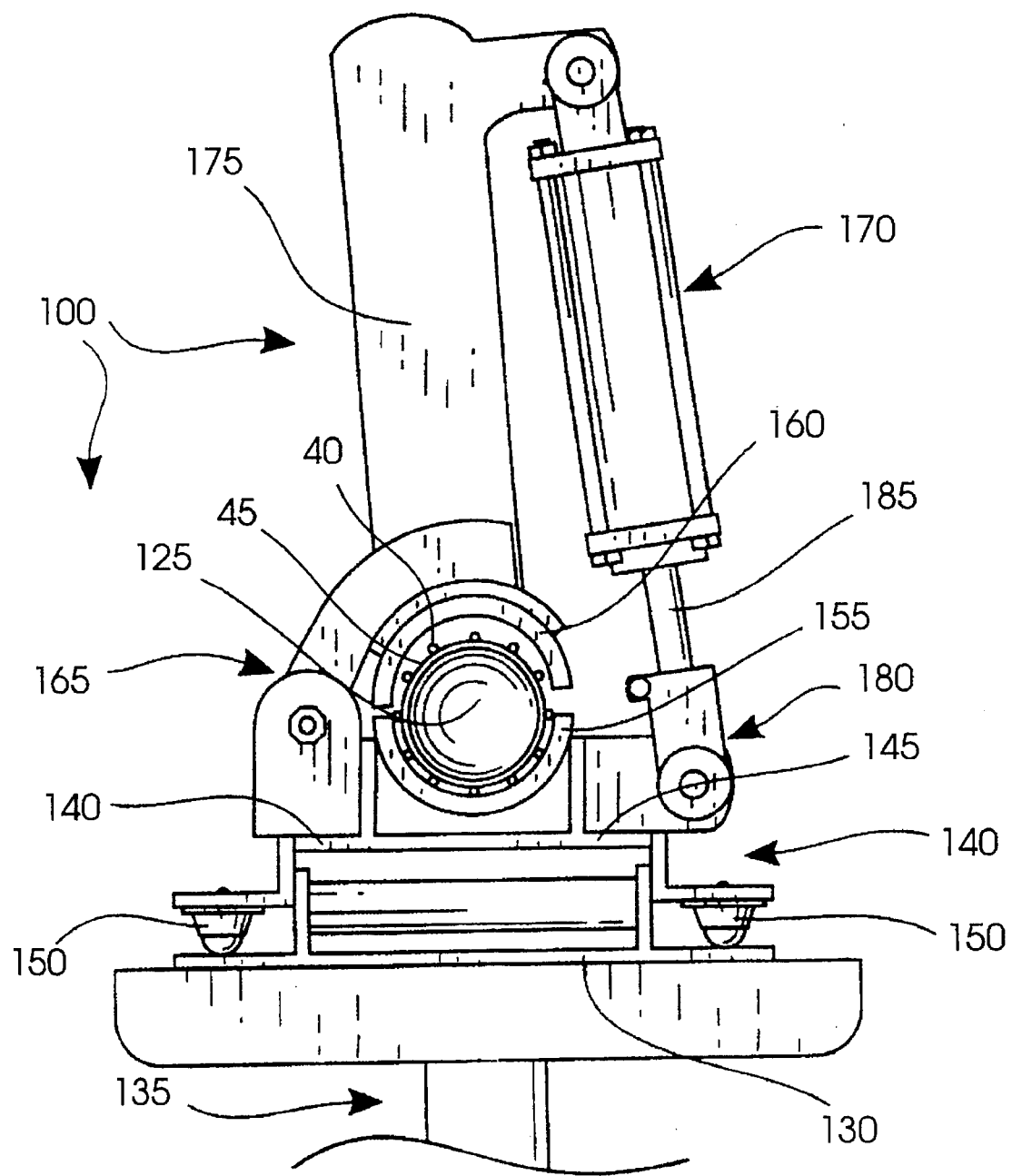
FIG. 3 is an enlarged fragmented end elevational view of the preferred Translational Press and Mandrel in operation.

The preferred embodiment of our Translational Press 100 and Mandrel 105 apparatus is used to straighten bent, out of round or otherwise distorted cages 30. A damaged cage is sheathed onto the generally cylindrical mandrel 105 (FIG. 2). This mandrel 105 is mounted to a rigid stanchion 110. Preferably the stanchion 110 is disposed on the rear of a trailer. A mounting flange 115 on the stanchion 110 mates with a mounting flange 120 on the proximal end of the mandrel 105. The distal end 125 of the mandrel 105 is solid and rounded to facilitate reception of the cage 30. Hence, when a bent cage 30 is slid over the mandrel 105 it is initially straightened to some degree.

Final straightening of the cage is carried out by compressing it with a translational press 100. The press 100 is comprised of a track 130 supported on two or more stands 135 directly below the mandrel 105. A carriage 140, comprising a frame 145 and casters 150, carries the operative components of the press 100 along the track 130. The press 100 further comprises a pair of hemicylindrical dies 155, 160. The lower die 155 is affixed to the carriage frame 145. The second, upper die 160 is hinged 165 to the carriage frame 145. A pair of two-way hydraulic or pneumatic cylinders 170 extend from brackets 175 on the upper die 160 to pivot points 180 on the carriage frame 145. When the rams 185 of the hydraulic cylinders 170 contract the upper die 160 closes toward the lower die 155 compressing the sheathed, damaged cage 30 to the contour of the cylindrical mandrel 105 thereby straightening it. Specifically, the interior of the cage is contoured to the external diameter if the mandrel 105 and the exterior of the cage to the internal diameter of the joined dies 155, 160.

Next, any welds that were originally found broken during inspection or which were broken during straightening are rewelded employing the necessary welding procedure. Whereas most of the cages 30 employed in modern baghouses 40 are constructed of stainless steel, a MIG welding process is employed.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may the made of the invention without departing from the scope thereof, it is to be understood that all matter herein set forth or shown in the accompanying drawings is to be interpreted as illustrative and not in a limiting sense. For example, the use of the press may not be necessary where a cage is only slightly bent inward.

What is claimed is:

1. A device for straightening baghouse filter cartridge cages, said device comprising:

a rigid, generally cylindrical fixed mandrel adapted to temporarily coaxially receive a cage to be straightened;

a carriage slidably displaceable along the length of said device;

press means secured to said carriage for contacting and straightening said cage said press means comprising a pair of generally hemicylindrical dies adapted to be forced together; and, contraction means secured to said carriage for compressing said press means about said cage coaxially fitted on said mandrel.

2. The device as claimed in claim 1 wherein said mandrel comprises a closed generally rounded distal end for receiving said cage.

3. The device as claimed in claim 2 wherein said mandrel compresses a flange disposed on a proximal end.

4. A device for straightening baghouse filter cartridge cages, said device comprising:

a rigid, fixed, generally cylindrical mandrel adapted to temporarily coaxially receive a cage to be straightened;

a translational press slidably displaceable along the length of said mandrel to contact the entire length of said cage, said press comprising:

a pair of generally hemicylindrical dies adapted to be forced together to straightening said cage; contraction means for compressing said dies about said cage and said mandrel.

5. The device as defined in claim 4 wherein said press is secured to a slidably displaceable carriage.

6. The device as defined in claim 5 wherein said a track disposed below and generally parallel to said mandrel to receive said carriage.

7. The device as defined in claim 6 wherein said contraction means is hinged to said carriage.

8. The device as defined in claim 7 wherein one of said dies is fixed to said carriage.

9. The device as claimed in claim 8 herein said mandrel comprises a closed generally rounded distal end for receiving said cage.

10. The device as claimed in claim 9 wherein said mandrel comprises a flange disposed on a proximal end.

11. The device as claimed in claim 10 wherein said mandrel is disposed is a generally horizontal position.

12. A device for straightening baghouse filter cartridge cages, said device comprising:

rigid, fixed, generally cylindrical, generally horizontal mandrel adapted to temporarily coaxially receive a cage to be straightened;

a translational press comprising:

a track disposed below and generally parallel to said mandrel;

a carriage engaging said track and slidably displaceable along the length of said track and said mandrel:

a pair of hinged generally hemicylindrical dies adapted to be forced together to form a generally cylindrical form, one of said dies mounted to said carriage;

compression means for forcing said dies together to engage and straightening said cage about said mandrel.

13. The device as defined in claim 12 wherein said compression means is hinged to said carriage.

14. The device as claimed in claim 13 wherein said mandrel comprises a closed generally rounded distal end for receiving said cage.

15. The device as claimed in claim 14 wherein said mandrel comprises a flange disposed on a proximal end.

* * * * *